Nov. 26, 1968   S. S. KANAREK   3,413,639
RADIO POSITION PLOTTER
Filed July 26, 1967   4 Sheets-Sheet 1

INVENTOR.
SHEPARD S. KANAREK
BY
OSTROLENK, FABER, GERB & SOFFEN
ATTORNEYS

United States Patent Office 3,413,639
Patented Nov. 26, 1968

3,413,639
RADIO POSITION PLOTTER
Shepard S. Kanarek, 115 Wayne St.,
Jericho, N.Y. 11753
Continuation-in-part of application Ser. No. 443,824,
Mar. 30, 1965. This application July 26, 1967, Ser.
No. 656,162
10 Claims. (Cl. 343—112)

ABSTRACT OF THE DISCLOSURE

A radio position plotter for determining the position of a vessel, comprising a first and second light beacon, the beams of which intersect on a nautical chart to indicate the position of the vessel on the chart; each of the beacons being movable by a separate cardioid face or other face cam; a single shaft longitudinally translatable into engagement with one or the other of the cams for adjusting the position of one or the other of the beacons; a single antenna connectable by means of the aforementioned cams to each of the beacons, in turn, for adjusting the position of the beacons in turn to point away from the chart positions of each of the beacons to the chart position of the vessel; differential gear means cooperating in the determination of the position of the vessel and cooperating with a compass device for realigning the antenna with respect to the direction in which the vessel is aimed; an articulated arm supporting each of the beacons for keeping the direction in which the beacons point constant; a novel light projecting beacon for the position plotter; a non-linear compass adjustment means for compensating for the magnetic environment of the compass; and a glare-proof cabinet for the position plotter.

This invention is a continuation-in-part of application Ser. No. 443,824, filed Mar. 30, 1965, now abandoned.

This invention relates to a radio position plotter and a method of navigational position plotting.

Radio direction finders now in use are sensitive radio receivers which utilize a rotatable receiving antenna so constructed that it receives a minimum signal when its axis is aligned with the transmitting station. Radio direction finders may be equipped with a null meter, which indicates the level of the signal received. For marine navigation, the radio direction finder and a compass are both mounted upon a vessel in alignment with, or at a known angular relationship to, the lubber line, that is, the fore-aft axis of the vessel. The compass is compensated for its magnetic environment.

In determining a vessel's position with such radio direction finders, the receiver is tuned to a frequency being broadcast by a marine navigational beacon as shown on a nautical chart for the area involved. As it is often difficult to locate a broadcasting station by simply tuning its frequency, it is usually necessary to verify the station identification by its Morse code signal which is also indicated on the nautical chart. The antenna is then rotated until the audible beacon signal and the visual reading on the null meter indicate that the antenna is receiving a minimum signal. In this position, known as the null position, the antenna is in alignment with the signal being broadcast by the transmitting station, that is, the antenna is pointed directly at or directly away from the transmitting station. Then the angle $\alpha$ between the antenna and the lubber line must be determined. Similarly, the angle $\beta$ between the lubber line and magnetic north is determined using the boat's compass. (When sailing in a local area of about 20 miles radius, the variation between true north and magnetic north may be disregarded. In this case, however, the bearing on the chart must be taken from the magnetic compass rose rather than from the true north compass rose). The angle $\gamma$ of the antenna relative to magnetic north is determined by subtracting angle $\beta$ from angle $\alpha$ or adding angle $\beta$ to angle $\alpha$, depending upon the orientation of the lubber line with respect to north. Then, on the nautical chart, a line parallel to angle $\gamma$ (on the chart's magnetic compass rose) is plotted through the center of the first beacon. An identical sequence of operations is required to plot a line through the second beacon. The intersection of the two lines plotted on the chart indicates the immediate position of the vessel.

It is apparent that this procedure of determining the position of the vessel is time consuming and requires lengthy calculations which may result in errors.

An object of the present invention is to eliminate the necessity for such calculations through the provision of a mechanically operable radio position plotter.

Another object is the provision of a radio position plotter which will indicate automatically to the marine navigator the position of his vessel on a nautical chart.

It is another object of the present invention to provide a radio position plotter requiring only a single radio antenna.

It is another object of the present invention to provide a radio position plotter employing two light projectors for intersecting light beams which projectors are oriented by a device using one radio antenna.

It is a further object of the present invention to provide a radio position plotter which employs intersecting light beams to indicate to a marine navigator his position on a nautical chart.

It is a further object of the present invention to provide an effective projecting device for the light aforementioned.

It is another object of the present invention to provide a linking means between the radio antenna and the light projector, whereby the light projector may be repositioned when a nautical chart is replaced or reoriented, while the direction of aim of the light projector remains constant with respect to the direction of aim of the antenna. This eliminates any alignment and recalibration problems when charts are changed.

In the accomplishment of the objectives of the present invention it was found desirable to provide a motion transmission mechanism for connecting a directional antenna with two optical projectors which projectors are adapted to project narrow beams of light across a chart, whereby the intersection of the two light beams will indicate the location of the vessel to an observer.

The mechanism connecting the single antenna with the two light projectors comprises an antenna having a knob connected to it for manually rotating the antenna until the antenna receives a null signal, which is indicated in a null signal indicator.

A first shaft is connected, e.g., by a gear means, with the antenna, whereby as the antenna is rotated, the first shaft is rotated a corresponding amount. The first shaft has affixed to it an orienting device connectable by gear means to individual light projector beacons for orienting the directions of aim of the beacons with the direction of aim of the antenna. The first shaft is longitudinally translatable so that the reorienting means on the shaft can be brought into engagement with a means connected either with the first light projector or with the second, but not with both at the same time. A button means is provided for longitudinally translating the first shaft.

On a position plotter, when a chart is replaced with another or when a chart is reoriented, the light projectors must be repositioned at the locations on the chart corresponding to the radio signal sources, without requiring complicated procedures. The apparatus of the invention fulfills this requirement. Each light projector is connected with the orienting device by a multi-stage belt and pulley or sprocket and chain arrangement. The multi-stage arrangement may be pivoted at each of the intersections where the pulleys or sprockets are located, as will be described in detail. But no matter how the arrangement is pivoted or moved, the orientation of the light projector with respect to the antenna will remain constant.

The light emanating from the projector is desirably in a narrow beam, whereby the point of intersection of the light from the separate projectors might be determined with accuracy. Accordingly, the present invention contemplates the provision of a novel light projector which projects a generally rectangualr collimated light beam. Alternatively, the light signals may be transmitted through the use of illuminated or back-lighted opaque rods.

Especially in radio navigation position plotters used on small boats, ambient light near the position plotter may cause the projected light to be invisible. Accordingly, the radio position plotter may be supplied with a cover which shields the chart on which light is being projected to prevent ambient light from interfering with the view of the projected light.

A compass control is operatively connected with the motion transmission mechanism. A differential device may be used, e.g., a differential gear, which joins the antenna with a compass. As a ring about the compass is rotated so that its North indicator is aimed toward the magnetic North mark on the compass, a mechanism which determines the direction of aim of the light projectors is similarly rotated without affecting the direction of aim of the antennas. Thus, the apparatus of the present invention is able to automatically translate both compass information and radio beacon position information into a visual plot of the vessel's position upon a chart.

The compass control may include a device providing for compass variation adjustment and a device for non-linear compass correction.

The invention will appear more clearly from the following detailed description when taken in conjunction with the accompanying drawings showing, by way of example, preferred embodiments of the inventive idea.

Figure 1:
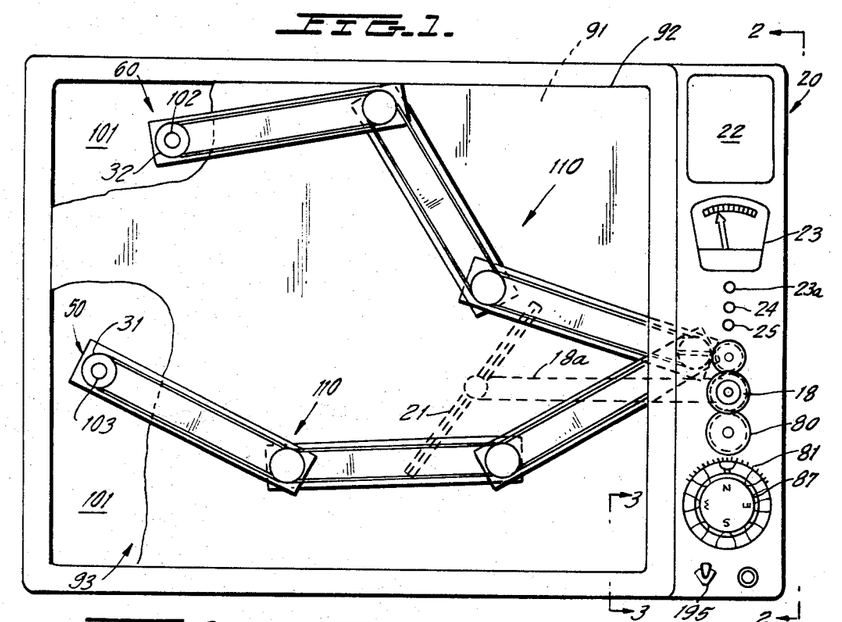
FIGURE 1 is a front view of a position plotter of the present invention.
Figures 2, 3, 6, 7, 14:
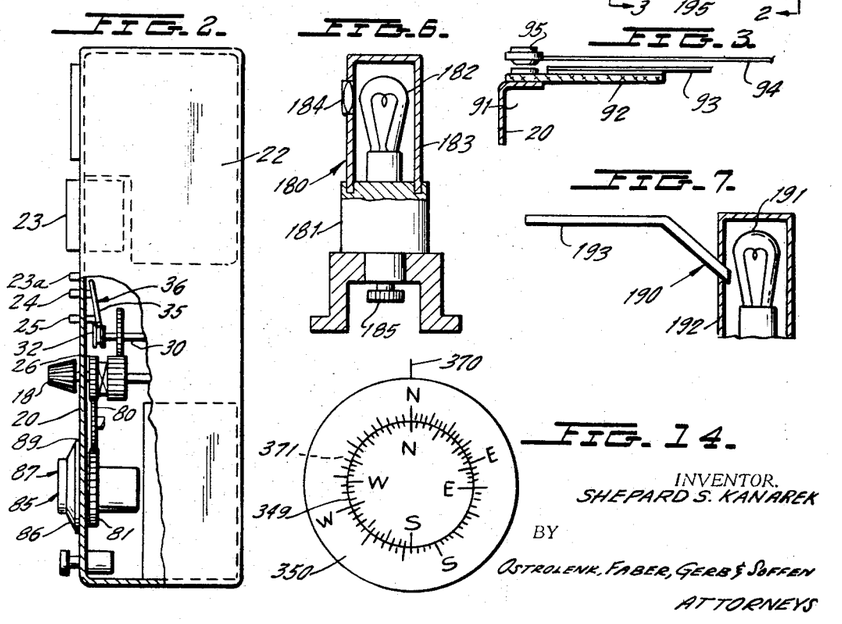
FIGURE 2 is a side view in the direction 2—2 of FIGURE 1, some parts being shown in section.
FIGURE 3 is an enlarged partial section along the line and in the direction 3—3 of FIGURE 1.
FIGURE 6 is an elevation in cross section of another embodiment of an optical projector.
FIGURE 7 is a cross section through a portion of a third embodiment of an optical projector.
FIGURE 14 is a front view of a compass adjustment device permitting non-linear compass correction.
Figure 8:
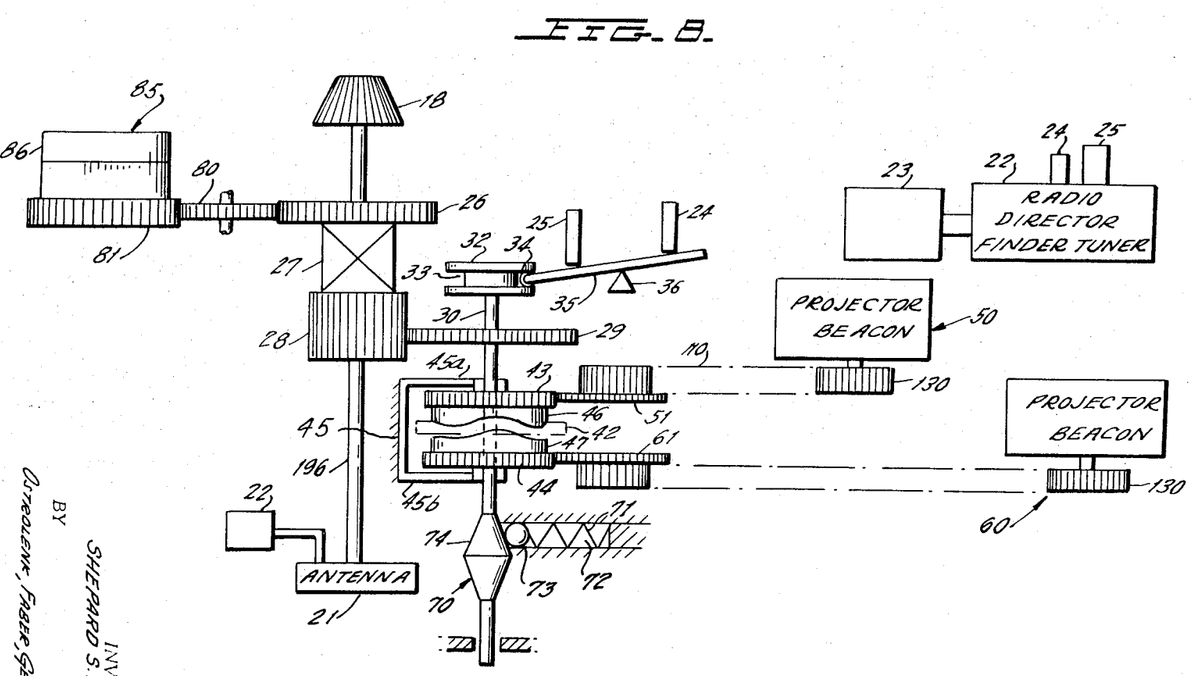
FIGURE 8 schematically illustrates a first embodiment of the mechanism of the instant invention.

All embodiments of the radio positon plotter shown herein include, as illustrated in FIGURES 1 and 2, a splash-proof preferably rectangular casing 20 and a highly directional antenna 21. Antenna 21, FIGURES 1, 2 and 8, is connected with the usual radio receiver 22 and a null meter 23. The radio receiver and null meter are tuned to various frequencies by rotation of knob 23a. In addition to null meter 23, the radio receiver 22 may emit an audible signal which it is receiving from the radio beacon to whose frequency the radio receiver is tuned. Since these devices and their connections are well known in prior art, they are indicated merely diagrammatically in the drawings.

The radio direction finder 22 is contained in the housing 20 and is connected with the rotatable directional antenna 21, which may be of the ferrite rod-loop type. The antenna is rotatably adjustable by means of control knob 18 which is mounted on the front panel of the housing 20 of the radio direction finder.

The radio direction finder receiver 22 operates at frequencies broadcast by existing radio navigation beacons and other radio transmitting stations. In addition to receiving transmissions in the marine navigation beacon band (including Consolan stations), it may also include circuits permitting the reception of marine, aviation and amateur bands, for example, ship to shore, Coast Guard, weather, etc., as well as ony other desired transmissions on AM or FM bands. The receiver 22 is provided with pushbuttons 24 and 25.

Once a desired radio beacon frequency is obtained by manual tuning of knob 23a and Morse code identification, the pushbutton tuning means 24, 25 for that beacon is set. The pushbutton tuning means 24, 25 are of a type well known in the art. Once a particular frequency has been found by manual rotation of knob 23a, the pushbutton tuning means 24 or 25 may be set so that when one of these buttons is depressed, the radio receiver 22 automatically returns to the frequency for which the pushbutton tuning means is set. Thereafter the receiver may be quickly and simply tuned to the radio beacons for which the pushbuttons are set, thus avoiding the necessity for beacon identification by manual tuning and Morse code signal. The radio direction finder shown in FIGURES 1 and 2 has two pushbutton tuning means so that two radio beacon frequencies selected for nautical position determination may be tuned automatically.

After the button 24 is pressed, knob 18 is rotated, which by belt drive 18a rotates antenna 21 until the null meter 23 registers the minimum radio reception at that frequency. If an audio signal is received by radio receiver 22, while the antenna is pointed other than directly at the radio frequency beacon, the receiver 22 will be emitting an audible signal. As the rotative position of the antenna approaches the direction of the radio frequency beacon, the intensity of the audible signal decreases and when the antenna is directly pointing at the radio beacon, the audible signal will cease.

Similarly, when button 25 is depressed, the antenna 21 is electrically connected with the null meter 23 and is adapted to receive the signal from the second radio beacon.

It is understood that with a ferrite rod-loop type antenna there are two null positions for the antenna at each radio frequency. However, the null positions are spaced apart rotatively at 180° from each other and, as will become apparent below, it does not matter whether the antenna receives a null signal at a particular rotative position or at a position 180° away from the first rotative position.

FIGURES 1, 2 and 8 show the manner in which rotation of antenna 21 by means of knob 18 enables the position of the vessel to be determined. When knob 18 is rotated it rotates shaft 196 and antenna 21. The differential gear 27, e.g., by its housing, is fixedly mounted upon shaft 196. Hence, rotation of knob 18 also rotates differential 27. Gears 26 and 28 are the end gears on differential 27. They are idlingly mounted with respect to shaft 196. Therefore, rotation of the housing of differential gear 27 about shaft 196 would rotate both end gears 26, 28. However, the gear 81, which is attached to the compass 8, which will be described in greater detail below, is held fixed by a friction or other locking means (not shown). That gear 81 cannot rotate prevents rotation of gear 80 and thus of gear 26. Hence, rotation of the housing of differential 27 causes rotation of the end gear 28 of the differential.

Since the end gear 28 alone rotates when the housing of differential 27 rotates with shaft 196, the rate of rotation of gear 28 will be twice that of shaft 196. Gear 28 is meshed with gear 29 which is in turn affixed to shaft 30. The rotation of shaft 30, as will be described below, is transferred to the light projector beacons which project light in a fashion enabling the chart position of the vessel to be determined. The light projector beacons must rotate to the same extent as the antenna 21. Since gear 28 is rotating twice as fast as shaft 196 and hence, twice as fast as antenna 21, gear 29 is made twice the diameter of gear 28, whereby gear 28 rotates half as fast as gear 28 and the rate of rotation of shaft 30 is stepped down to the rate of rotation of shaft 196.

Gear 28, as can be seen in FIGURE 8, is extra tall. Gear 29 is affixed to shaft 30 and the shaft is caused to move upward and downward, as viewed in FIGURE 8, by means to be described. The increased height of gear 28 permits gear 29 to remain in continuous engagement with gear 28 during the upward and downward movement of gear 29.

Secured to the shaft 30 is a yoke 32 having an annular notch 33 that receives the roller type cam 34 which is connected to pivotable lever 35. Notch 33 is annular so that roller cam 34 may remain within the notch as the shaft 30 and the yoke 32 are rotated. Lever 35 pivots on fixedly supported pivot 36 which is secured within the housing 20.

Pushbutton tuning buttons 24, 25 extend out of housing 20 (see FIGURES 1 and 2). When each one is depressed, it not only causes the radio receiver to be turned to the frequency of a particular beacon, but each one is depressible into engagement with pivotable lever 35. The portion of buttons 24, 25 within housing 20 may be adapted with a separate means for engaging both the tuning means of radio receiver 22 and the pivotable lever 35. When button 24 is depressed, lever 35 pivots clockwise, as viewed in FIGURES 2 and 8, and roller cam 34 causes yoke 32 and, hence, shaft 30 to move upward along its longitudinal axis. Similarly, when button 25 is depressed, lever 35 pivots counterclockwise as viewed in FIGURE 8, causing cam 34 to move yoke 32 and shaft 30 downward, as viewed in FIGURE 8, along the longitudinal axis of shaft 30.

Fixedly secured to the longitudinally translatable shaft 30 is a transverse shaft or roller 42 which twists when shaft 30 is rotated and which moves longitudinally with shaft 30.

Gears 43 and 44 are mounted about shaft 30 so that they can freely rotate or idle with respect to the shaft. Gears 43 and 44 are secured by plates 45a and 45b, with respect to which the gears 43, 44 rotate to fixed support 45. Therefore, as the shaft 30 translates upward and downward, with respect to gear 28, the gears 43, 44 remain stationary.

Fixedly secured to the gear 43 is a downwardly facing cardioid face cam 46 and fixedly secured to the gear 44 is an upwardly facing cardioid face cam 47. The cardioid face cam 46 has inwardly and upwardly sloping sides which meet at an apex to form an upwardly indented notch across the cam 46. Similarly, the cardioid face cam 47 has inwardly and downwardly sloping sides which meet at an apex to form a downwardly indented notch in cam 47.

When button 24 is depressed, and shaft 30 moves upward, as viewed in FIGURE 8, the transverse shaft 42 engages the notched face of the cam 46 and the continued upward pressure on the inclinded sides of the cam 46 and causes cam 46 to rotate until the shaft 42 is seated securely in the notch on the cardioid face cam 46. Shaft 30 is restricted from rotating during translation thereof by the mesh between gears 28, 29.

Similarly, when the button 25 is depressed and the shaft 30 moves downward, as viewed in FIGURE 8, the transverse shaft 42 engages the notched face of cam 47 and presses against the inclined sides of the cam 47, thereby causing cam 47 to rotate until the shaft 42 is seated securely in the notch on the face of cam 47. The rotation of cam 46 in turn rotates gear 43, integrally connected thereto, which in turn rotates gear 51 and which through intermediate mechanism 110, to be described below, rotates beacon 50. As was noted above, the rotative position of shaft 196 and hence of antenna 21 varies directly with the rotative position of shaft 30. The rotative position of shaft 42, which is secured to shaft 30, is determined by the position of shaft 30. The rotative position of shaft 42, when button 24 is depressed, determines the rotative position of cam 46 which, through intermediate mechanism 110, to be described, determines the rotative position of and hence the direction in which light is projected by the light projector beacon 50. Therefore, the rotative positive of antenna 21 directly corresponds to the rotative position and direction of aim of light projector 50.

In a similar manner, when button 25 is depressed and shaft 42 is within the notch on the face of cam 47, the rotative position of antenna 21 through shaft 196, gears 27, 28, 29, shafts 30, 42, cam 47, gears 44, 61 and mechanism 110 determines the rotative position and direction of aim of light projector beacon 60.

As is apparent, knob 18, shaft 196, differential 27, gears 28, 29, longitudinal shaft 30 and transverse shaft 42 fixedly thereto connected, and the cardioid face cams 46, 47 serve as a means for aligning the projector beacons 50, 60 with the antenna 21 prior to the later rotation of knob 18 which rotates the antenna for finding the null radio signal position. Attached to shaft 30 is a detent or cam 70 for aiding the upward or downward longitudinal translation of shaft 30. As illustrated in FIGURE 8, the cam 70 is comprised of two conical elements joined at 74 at their bases. A spring 71 in a chamber 72 which is fixedly mounted within casing 20 biases a means, such as ball 73, against detent 70. When, as shown in FIGURE 8, the button 25 is depressed and the junction 74 of the conical portions of detent 70 has moved down past ball 73, the spring 71 biases ball 73 against the upper portion of cam 70 to drive the cam downward, thereby to drive the shaft 30 downward which, in turn, drives shaft 42 securely into and holds shaft 42 in the notch of cam 47 even when pressure on button 24 is released.

When button 24 is depressed and the shaft 30 moves upward, as viewed in FIGURE 8, once ball 73 rolls past junction 74, the biasing spring 71 pushes the ball 73 against the shaft 30 and drives the latter upward, as viewed in FIGURE 8. This pushes the shaft 42 against the cardioid face cam 46 until shaft 42 is securely in the notch of cam 46.

Alternate forms of the alignment means shown in FIGURE 8 may be provided. See, for instance, FIGURES 12 and 13, where similar elements to those in FIGURE 8 are similarly numbered. The longitudinal shaft 30' has thereto fixedly secured the yoke 32' and the gear 29'. In place of the transverse shaft 42 is another orienting device, such as cam disc 142, shown in elevation in FIGURE 12 and in plan view in FIGURE 13. The top and the bottom of the disc 142 are symmetrical. Considering the upper side, it is formed of inclined surfaces 143, 144 which meet at an apex 145. At the lesser thickness edges of the cam disc 142, notches 148 are provided for receiving positioning elements to be described.

Figures 10, 11, 12, 13, 15:
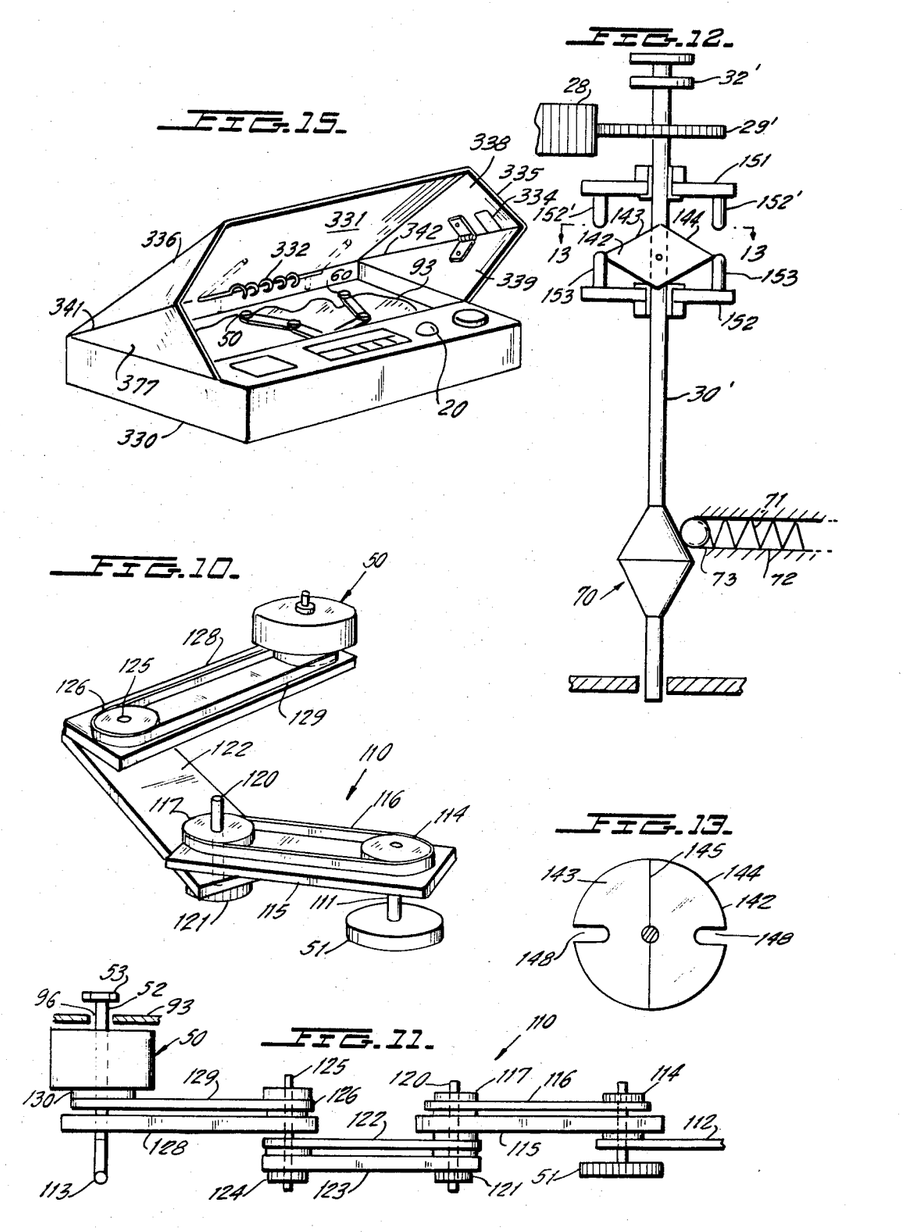
FIGURE 10 is a perspective of an articulated arm for a light projector for the mechanism of the instant invention.
FIGURE 11 is a side view of the projector arm of FIGURE 10.
FIGURE 12 is a view of an alternate embodiment of the longitudinally translatable shaft of the mechanism of FIGURES 8 and 9.
FIGURE 13 is a plan view of the shaft orienting element of the mechanism shown in FIGURE 12.
FIGURE 15 is a perspective of a glare-proof cabinet for the device of the invention.

Replacing gears 43 and 44 are the gears 151 and 152, respectively. Disposed at opposite positions 180° apart on the gear 151, are the substantially bullet-shaped projections 152', which are received within the notches 148 in a manner to be described. The gear 152 has identical projections 153 for being received within the notches 148. The projections 152 and 153 must be of sufficient length to be able to extend into the notches 148 when the cam disc 142 is moved toward either of the gears 152 or 153 by the shaft 30'. The inclined sides 143, 144 and the corresponding inclined sides on the bottom of the disc 142 are engaged by the projections 152', 153. As the shaft 30' is, for instance, forced downward, as illustrated in FIGURE 12, when the projections 153 are pressed against the bottom panels of the disc 142, the gear 152 rotates as the projections 153 slide up the inclined lower sides of the disc 142 until the projections 153 slip into the notches 148, where they are thereafter securely held. The positioning of the projections 153 in the notches 148 permits the shaft 30' to be later rotated by an intermediate mechanism operated by knob 18 of FIGURE 8 without the gear 152 slipping relative to the cam disc 142.

It is understood that when the shaft 30' is longitudinally translated upward, the same thing occurs to projections 152' and to gear 151 as occurred to projections 153 and to gear 152.

The rotation of gears 151, 152 due to the cam disc 142 being translated to provide movement of projections 152' and 153 into the notches 148 causes initial alignment between the respective projector beacons 50, 60 and the antenna 21 prior to the rotation of the antenna 21 by knob 18 to obtain a null reading on null meter 23.

Turning again to FIGURE 8, when cam 46 is rotated, it rotates gear 43 which, in turn, rotates gear 51. By means to be described in greater detail in conjunction with FIGURES 10 and 11, rotation of gear 51 rotates the light projector beacon 50 to a corresponding extent.

Similarly, when cam 47 is rotated, it rotates gear 44 which, in turn, rotates gear 61. The rotation of gear 61, in turn, rotates the projector beacon 60 in a manner to be described.

The end gear 26 on differential 27 has a gear 80 in engagement with it, which connects the gear 26 to a cooperating gear 81 on the compass 85. The compass 85 is used for providing an angular offset between the light projector beacons 50, 60 and the antenna 21, which angular offset is equal to the angle between North on the navigational chart and geographic North.

As can be seen in FIGURES 1 and 2, the compass 85 is mounted upon the panel of the housing 20. As shown in FIGURES 1, 2 and 8, a rotary ring 86 encloses the compass face 87. The ring 86 carries an index mark which should be aligned with the magnetic north indicator on the compass face 87. The ring 86 is fixedly secured to or is integral with the gear 81. Thus, turning of compass ring 86 rotates gear 26.

According to one embodiment of the compass of the invention, illustrated in FIGURE 2, the ring 86 consists of transparent material which is placed over a flat ring upon which an alignment index mark is printed. While true North remains the same wherever the vessel is located, magnetic north will vary from place to place. The index mark on ring 86 may be angularly offset from the nominal zero position on compass ring 50 to compensate for geographical compass variation which is indicated in degrees on all nautical charts.

When the compass ring is rotated, this rotates gear 81, gear 80 and gear 26, which through differential 27 rotates gear 28, gear 29, shaft 30 and shaft 42. The rotative position of shaft 42 determines the initial rotative position of beacons 50, 60 with respect to antenna 21. Thus, angular offset of the vessel from magnetic North may be compensated for. During the realignment of the projector beacons to compensate for angular offset of the position of the vessel, the antenna is held stationary, e.g., by a friction means or other locking means.

For example, with the antenna shaft 196 held stationary and with compass North aligned with chart North, no rotation of compass gear 81 by ring 86 would be necessary and the light projector beacons would be projecting light parallel to the axis of antenna 21. If, on the other hand, the chart is rotated, e.g., by rotation of the vessel, such that chart North and compass North differ by 30°, the compass ring 86 would be rotated through 30° markings, which would, through gears 81, 80, 26, provide an offset through the differential 27 such that the projector beacon light axes would be offset from the antenna axis by 30°.

Referring to FIGURES 1 and 3, the casing 20 is provided with orifice 91 over which a transparent sheet or support element 92 is positioned to cover the orifice. The transparent sheet, which may be of Plexiglas, is sufficiently rigid to support a flexible map or nautical chart, e.g., one made of paper, and is sufficiently transparent to permit light from projector beacons 50, 60, which beacons are beneath sheet 92, to pass through the sheet.

A map or nautical chart 93 is placed over the transparent sheet 92. The map or chart 92 may be a standard nautical chart or a portion thereof. The nautical chart selected must be of appropriate scale for the area in which the boat will be navigated.

The map or chart is covered by an acetate sheet 94 which holds the map flat in place and which is attached to the casing 20 by snap fasteners 95, or the like. The sheet 94 may be comprised of a circularly polarized material forming a glareproof screen.

The chart is placed on the transparent supporting surface 92 with the compass rose or true North index of the chart aligned with the compass North indicator on the compass face 87 when the compass ring 86 is in a position in which it provides 0° offset between the direction of aim of the projector beacons 50, 60 and the axis of the antenna 21. If the compass rose of the chart is aligned with the vertical reference of the chart 92, the face of the compass is aligned with the vertical axis of the housing 20, as viewed in FIGURE 1. However, if the compass rose of the chart is offset from the vertical reference of the plotting surface, this offset must be reflected in the initial position of the North marked on the compass face 87 so that the compass and the chart are properly aligned.

For the invention to be of use, the geographical area depicted on the chart must have at least two separated radio beacons or sources of radio energy which can be used in conjunction with the invention to locate the vessel on the chart. As illustrated in FIGURE 1, the chart 93 has land masses 101 on which are located radio beacons 102 and 103.

If two marine navigation beacons are not available, aircraft beacons or commercial radio transmitters may be used as alternates to the navigation beacons because of the directivity of their respective transmissions.

Once the chart has been positioned and the location of the radio beacons has been noted, light projector beacon 50 of the present invention is moved beneath the chart location of one of the radio beacons 103, and light projector beacon 60 is moved beneath the chart location of the other of the radio beacons 102. Referring to FIGURES 1 and 8, it is apparent that when the beacons 50, 60 are being positioned, they must have their positioning correlated with the radio direction finder tuning buttons 24, 25. Therefore, if button 24 is pretuned to receive the radio signal from radio beacon 103, and if the button is depressed, which operatively connects the antenna 21 with light projector beacon 50, then beacon 50 must be on the chart position of radio beacon 103. This ensures that when the antenna 21 is adjusted to receive a null signal from the actual radio beacon depicted by radio beacon 103 on the chart, the light projector beacon 50 will have been rotated, in a manner described below, to be aiming in a direction to indicate the chart position of the vessel. Similarly, when pretuned button 25, which is tuned to the actual radio beacon depicted by beacon 102 on the chart, is depressed, which operatively connects antenna 21 with light projector beacon 60, the beacon 60 must be positioned on the chart position of radio beacon 102.

Since different charts may be used to plot the position of the vessel, whereby the radio signal producing beacons 102, 203 may be positioned at various locations on the different nautical charts 93, the light projector beacons 50, 60 should be readily positionable at all locations within the orifice 91, so that they can be positioned at the radio beacons on a particular chart. Because the invention relies on the correlation between the direction of aim of antenna 21 and the directions of aim of beacons 50, 60, it is essential that the directions in which light is projected from beacons 50, 60 remain constant with respect to the direction in which the antenna 21 is pointing, regardless of the manner in which the light projecting beacons are moved about in the orifice 91.

As is shown in detail in FIGURES 10 and 11 and as is shown in plan view in FIGURE 1, the present invention contemplates, in the preferred embodiment, the mounting of the beacons 50, 60 on an articulated arm 110. Only the articulated arm for beacon 50 will be described in detail, since the arm for beacon 60 is identical. Gear 51, the position of which can be seen in FIGURES 8, 10 and 11 is fixedly connected to a supporting shaft 111. Shaft 111 is supported by casing element 112 which is fixedly attached within the casing 20 to support the shaft 111 and which also supports the entire articulated arm 110 and the beacon 50. The platform or arm 112 is in idling relationship with shaft 111, whereby it does not interfere with the rotation of the shaft.

Fixedly secured to the shaft 111 is a second gear 114 which is rotated by gear 51. A support platform 115 is idlingly mounted on shaft 111, and serves as a support for the later described shaft 120. The gear 114 is connected by a motion transmitting belt 116 with gear 117 which is fixedly secured to shaft 120. As gear 114 rotates, gear 117 rotates correspondingly in the same direction. Also fixedly secured to shaft 120 is gear 121 which rotates with gear 117.

Shaft 120 has idlingly secured to it platform 115, whereby the shaft 120 can rotate without affecting the position of the platform 115. Also secured to the shaft 120 in idling relationship is another platform 122, which supports the next shaft 125 in the articulated arm 110. A belt drive means 123 connects the gear 121 to the gear 124, which is fixedly secured to shaft 125. Platform 122 is idlingly secured to shaft 125 and supports the same without interfering with the rotation thereof. Fixedly secured to shaft 125 is gear 126 which is rotated by the gear 124 to the same extent as gear 124 is rotated. A platform 128 is idlingly mounted upon and secured to shaft 125 for supporting the beacon 50. A belt drive 129 transmits the rotation of the gear 126 to the beacon 50 and causes the same to rotate as gear 126 rotates.

Auxiliary support means may be provided to support the beacon 50 and reduce the stress on the shaft 111. For instance, the beacon 50 in FIGURE 11 has a screw 52 having a head 53 thereon which is inserted into the beacon 50. At the position on chart 92 where a radio beacon, such as beacon 103 is located, the chart has an opening 96 therethrough through which the screw 52 might be inserted. The head of the screw may rest on the chart 93, or on the acetate sheet thereover, and thereby enable the beacon 50 to be suspended from the chart 92.

As an alternative to or supplemenatry to the employment of screw 52, the beacon 50 might be supported by a ball bearing caster 113 which rolls upon the bottom of the orifice 91. Other support means, well known in the art, for the beacon or articulated arm 110 might be provided.

Additional shafts like shaft 120, 125 and additional connecting belts like belts 116, 123 may provide more articulated portions on the belt drive connecting means 110. The belt and pulley or gear arrangement may be replaced with a chain and sprocket, a bead chain or any similar motion transmiting arrangement. It is inherent in the belt drive beacon support arm 110 that regardless of how the arm 110 is bent at its connecting shafts 120, 125, the direction in which the beacon 50 is pointing, remains the same.

Other means may be provided for joining the gears 51, 61 with their respective light projector beacons 50, 60. This includes a flexible shaft. However, whatever means for connecting the beacons to their gears 51, 61 is employed, it is preferable that the projector beacons be continuously aimed in the same directions, regardless of where they are moved within the orifice 91.

The light projector beacons 50, 60 used in conjunction with the present invention preferably project as collimated a light beam as possible, whereby the point of intersection of the light emitted from beacons 50 and 60 can be accurately determined. To accomplish this, beacons 50, 60 are preferably of the type shown in FIGURES 4 and 5. Beacon 50 will be described in detail, it being understood that beacon 60 is of the same construction.

Figures 4, 5, 9:
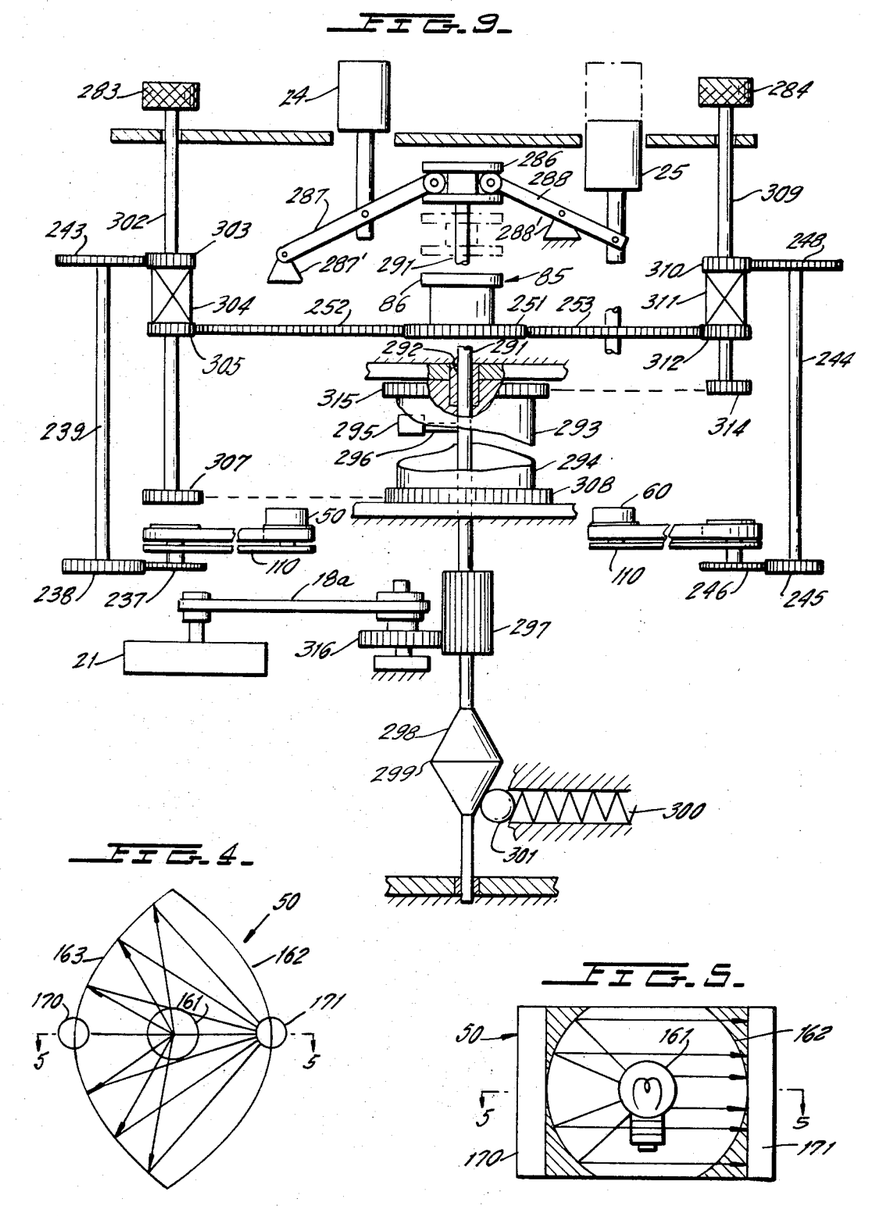
FIGURE 4 is a horizontal section through one embodiment of an optical projector.
FIGURE 5 is a partial cross section of the projector of FIGURE 4 along the line 5—5.
FIGURE 9 schematically illustrates another embodiment of the mechanism of the instant invention.

FIGURE 4 is a plan view in cross-section of the projector beacon 50. With the exception of the hereinafter described lenses 170 and 171, the entire interior of the beacon is coated with a reflective material, such as a silver paint. A light source, e.g., any standard light bulb 161, which light source emits light in all directions, is positioned within beacon 50.

The sides 162 and 163 of the interior of the beacon are comprised of portions of an ellipse. Considering side 162, it is a portion of an ellipse having light source 161 as a first focus and lens 170 as a second focus. Similarly, side 163 is part of an ellipse having light source 161 as a first focus and lens 171 as a second focus.

As illustrated in FIGURE 4, the light from source 161 which strikes the interior of side 163 is directed toward the second focus of the ellipse having side 163 as part thereof and is, therefore, all concentrated upon the lens 171. Although not shown in FIGURE 4, light from source 161 that strikes the interior of side 162 is focused by the curvature of side 162 upon lens 170.

The lenses 170, 171 are shaped so as to bend the light reflected thereon so that the light is emitted in parallel or collimated rays.

Turning to FIGURE 5, which shows a vertical cross-section of the beacon 50, it can be seen that the interior sides 162, 163 in a vertical plane are comprised of portions of a sphere. When light from source 161 strikes the interior of sides 162, 163, the light is directed in parallel rays toward lenses 170, 171.

As is shown in FIGURE 5, in a vertical plane the lenses 170, 171 are elongated cylindrical lenses.

The interior reflector surface, as shown in FIGURES 4 and 5, is continuous, except that along the lenses 170, 171 the surface is broken whereby the light can pass from within the projector beacon 50 to the lenses. The combination of the elliptically shaped sides in a horizontal plane and the spherically shaped sides in a vertical plane focuses light upon lenses 170, 171 which light is refracted by lenses 170, 171 into two collimated rectangular blocks of light.

Note that with the beacon of FIGURES 4 and 5, light is directed in opposite directions from within the beacon. As was discussed above, the ferrite rod-loop type antenna 21 has two null positions which are 180° apart. If the beacon 50 projected in only a single direction and the null position of the antenna 21 was found with the antenna facing in the direction 180° away from the correct direction, then the light from the beacon would be projected into the wrong direction. This drawback is overcome by the two direction projection of the beacon 50.

However, even if the light projector beacon projects light in only a single direction, the present invention could still be used. After the null signals from each of the radio beacons have been received by the antenna, and if the antenna has been turned so that one beacon points 180° away from the proper direction, then the projected light beams would not intersect. The projected lights from the beacons only will intersect when the light from both projectors is aimed from the positions on the chart of the two radio beacons toward the single position of the vessel on the chart.

Alternate forms of light projectors are shown in FIGURES 6 and 7. In FIGURE 6, the light projector 180 includes a socket base 181 which carries a bulb or other light source 182 and which is enclosed by an opaque cap 183. The cap carries a cylindrical lens 184 which is fitted into an opening provided in the cap adjacent the light source 182, so that a narrow collimated light beam may be projected through the lens upon the underside of the chart 93. The socket base 181 carries a gear 185, which is the equivalent of the gear 130 (see FIGURE 11) that is beneath the projector beacons 50, 60. The light projector 180 of FIGURE 6 projects light in a single direction. Where it is desired to have light projected in opposite directions, a second lens like lens 184 would be positioned on the other side of the cap 183, providing two collimated light beams 180° apart.

A second alternative form of light projector is shown in FIGURE 7, wherein the projector 190 has a light bulb or other light source 191 surrounded by a casing 192, and is similar in form to the projector 180, except that the lens 184 is replaced by an elongated-Plexiglas rod 193 which may be covered by an opaque coating and provided with a scribed line. The material of the rod 193 may be other than Plexiglas since it is necessary that the material of the rod have the capability of conducting light along itself whereby the scribed line in the opaque coating may be observed along the length of the rod. The intersection of the scribed lines of the two beacons will enable the position of the vessel to be determined. In all other respects, the projector 190 may be similar to or identical with the projector 180.

While the projector beacons 50, 60 and other light projecting means project light, it is to be understood that other means may be used, e.g., rotating pointers, which are able to intersect on the face of the chart in accordance with the principles of the present invention.

The operation of the invention will be described in connection with FIGURES 1, 2 and 8.

The chart 93 is positioned on sheet 92 and the light projector beacons 50 and 60 are positioned beneath the radio transmitting stations or beacons 102, 103 on the chart.

The navigator turns on the device by using the switch 195 which will energize the radio direction finder 22.

The navigator then adjusts the compass ring 86 to compensate for the compass direction in which the vessel is pointing. This realigns the directions of aim of the light projector beacons 50, 60 in the same manner described herein above.

The button 24 is depressed, which tunes receiver 22 for the signal generated by beacon 103 and moves the shaft 30 upward, thereby moving the transverse shaft 42 into engagement with the cardioid face cam 46. Cam 46 rotates, thereby rotating the light projector beacon 50, through intermediate mechanism 110, in the manner described above. This correlates the direction of aim of the antenna with the direction of aim of beacon 50 before the antenna 21 is rotated by knob 18 to find the null signal antenna position.

The knob 18 is then manually rotated to rotate the shaft 196 and the antenna 21. The antenna 21 is rotated until the null meter 23 registers the minimum strength radio signal, which indicates that the antenna is aimed toward the beacon 103. If the radio receiver emits an audible signal from beacon 103, when the antenna is aimed toward the actual beacon depicted by the beacon 103 on chart 93, the audible signal will cease. When antenna 21 has been rotated until a null signal is received, light from beacon 50 is shining on the chart 93 from the position of the beacon 103 toward the position of the vessel.

The button 25 is next depressed, which longitudinally translates shaft 30 downward and brings the transverse shaft 42 into engagement with the cardioid face cam 47, thereby correlating the direction of aim of light projector beacon 60 with the axis of antenna 21. This also tunes radio receiver 22 to the radio signal being transmitted by radio beacon 103.

Then, manual knob 18 is rotated which rotates the antenna 21 until a null signal is received. Once a null signal is obtained, the light from projector 60 will be pointing from the chart position of radio signal transmitter 102 to the chart position of the vessel.

The point at which the light from projectors 50 and 60 intersects on the chart is the chart position of the vessel. In this manner, the position plotter of the present invention enables a navigator to plot the position of the vessel.

FIGURE 9 illustrates an alternate embodiment of an apparatus designed in accordance with the invention hereof. The apparatus is used in conjunction with a housing 20 having the radio direction finder 22, null meter 23, and pretuning buttons 24, 25. It is also used conjunction with the compass 85 and with antenna 21. However, as will become apparent, the device of FIGURE 9 requires not a single knob 18 for rotating the antenna, but two knobs 283 and 284.

A lever 287 for button 24 has a pivot 287'. When button 24 is depressed, it moves the yoke 286 and the longitudinal shaft 291 downward, with results to be described.

The button 25 is connected with a lever 288 which is pivoted at 288'. When button 25 is depressed, it moves yoke 286 and shaft 291 longitudinally upward, with results to be described.

The shaft 291 extends from yoke 286 through bearings 292 and extends freely through opposed cardioid face cams 293 and 294 which are identical to cams 46 and 47 in the device of FIGURE 8. As with cams 46, 47, the cams 293, 294 are held by a fixed support against longitudinal translation when the shaft 291 longitudinally translates. The cams have inwardly curved faces and a valley adapted to receive transverse shaft or roller 295 which is carried by an arm 296 fixedly attached to shaft 291. The cam 293 is provided for beacon 60 and the cam 294 is provided for beacon 50.

The shaft 291 also carries an extended width gear 297 fixedly attached to rotate with the shaft 291 and is provided with cam or dent 298 which is identical in function and design to the cam or dent 70 of FIGURE 8. Thus, the ball 301 in front of coil spring 300 will tend to maintain the shaft 291 in either an upward or a downward position, depending on which conical surface is engaged by the ball 301.

The control knob 283 is connected by shaft 302 with a differential gear 304. The gear 303 is an end gear of a differential gear comprised of end gear 303, differential gear 304 and end gear 305. Gear 303 is connected to the light projector beacon 50 by means of gear 243, shaft 239, gears 238 and 237, and intermediate mechanism 110. The end gear 305 of the differential is connected to the compass control ring 86 by gears 252, 251 in a manner similar to that shown in FIGURE 8. The shaft 302 is connected to cam 294 by gear 307 and gear 308, the latter being firmly connected with the cam 294.

Similarly, the control knob 284 is connected by shaft 309 with gear 314. Gear 310 is an end gear of a differential gear 311 having gear 312 as the other end gear of the differential. The differential 311 is fixedly secured to shaft 309 and the end gears 310, 312 of the differential are idlingly mounted on shaft 309.

The gear 310 is connected to the light projector beacon 60 through gear 248, shaft 244, gears 245, 246 and intermediate mechanism 110. The differential 311 is connected to gear. Gear 312 is connected to the compass control ring 86 through intermediate gears 253 and 251, in the manner of gear 305. The shaft 309 connects knob 284 with gear 314 and gear 315, the latter being firmly connected with cam 293.

As in the embodiment of FIGURE 8, when the knobs 283, 284 are rotated to readjust the direction of aim of the antenna 21 and the light projector beacons 50, 60, the compass control ring 86 or the gear 251 to which the compass control ring is connected are secured against rotation, e.g., by a friction device. Therefore, rotation of, for instance knob 283 causes rotation of the housing of differential 304. However, end gear 305 of the differential is held stationary. Therefore, end gear 303 of the differential rotates through twice the distance rotated by shaft 302. Since light projector beacon 50 must rotate to the same extent as the antenna 21 when knob 283 is rotated, the gear 303 is twice the diameter of the gear 243, whereby the arcuate distance through which beacon 50 rotates is the same as the arcuate distance rotated by antenna 21. For the same reason, the diameter of end gear 310 of differential 311 is twice the diameter of gear 248, which causes rotation of beacon 60 to correspond to rotation of the antenna.

The gear 297 remains enmeshed with gear 316 which is connected by belt 18a' with antenna 21.

The device of FIGURE 9 operates as follows. The tuner 22 is tuned to beacon 103 by the operator depressing button 24, which also forces downward yoke 286 and shaft 291. The roller 295 will press against the cardioid face cam 294 and this pressure will cause the cam 294 to turn until the roller 295 comes to rest in the valley of cam 294.

During the downward movement of the shaft 291, the apex 299 of detent 298 has moved below the ball 301 so that the ball 301 presses against the upper conical portion of the detent 298 to hold the shaft 291 in its lower position and to hold the roller 295 in the valley of the cam 294 even after the button 24 is released.

As noted above, a friction device is holding the compass stationary. When control knob 283 is now rotated, its rotation is transmitted through shaft 302, gears 307, 308, cam 294, arm 296, shaft 291, gears 297 and 316, belt drive 18a' to antenna 21; and through shaft 302, differential 304, end gear 303, gear 243, shaft 239, gears 238, 237, mechanism 110 to beacon 50. Thus, when antenna 21 is rotated so that receiver 22 receives a null signal, beacon 50 will be aimed from the chart position of beacon 103 to the chart position of the vessel.

When the button 25 is depressed and the radio direction finder 22 is automatically tuned to radio beacon 102, the alternate embodiment assumes the position shown in FIGURE 9, where roller 295 is in engagement with cam 293, which in the manner described above, correlates the direction of aim of antenna 21 and beacon 60. The compass control ring 46 is being held stationary by the friction device. In the same manner as with knob 283, rotation of knob 284 aims light projector beacon 60 from the chart position of radio beacon 102 to the chart position of the vessel.

Compass correction for repositioning the projector beacons 50, 60 with respect to the antenna 21 can be made either before the beacons are rotated or afterward. With the embodiment of FIGURE 8, compass correction is provided before the beacons are rotated. In the embodiment of FIGURE 9, when the compass ring 86 is being rotated, it simultaneously rotates the gears 252 and 253 to the same extent, thereby realigning both of the light projector beacons 50 and 60.

FIGURE 14 shows a device for providing non-linear compass correction. This correction is provided by a fixed marker 370 which spans both the face of the compass 349 and the transparent control ring 350 and which is attached to the front panel of the casing 20 by an adjustable device which permits it to be angularly offset to compensate for the magnetic environment of the compass and for regional variations in the magnetic north direction.

The ring 89 of the embodiment of FIGURES 1, 2 and 8 is replaced by a flat card 371 which is contained within the transparent compass control ring 350 and which is calibrated in the standard way during pre-operational alignment to reflect non-linearities of the compass response often caused by the magnetic environment of the compass. Thus, the card 371 constitutes a compass card.

A compass card calibrated to reflect non-linearities of compass response is illustrated in FIGURE 14. Note that the distance between the North and East markers on the card is less than 90° whereas the distance between the West and North markers on the card is more than 90°.

In use, the control ring 350 is rotated which rotates card 371 until the compass heading on the card 371 (in degrees or points) matches the heading on the face of the compass which is under the index marker 370. For example, note that in FIGURE 14 the North indicator of the compass and the North indicator on the compass card 371 are both under the marker 370. If the vessel now rotates so that the North indicator on the compass face 349 moves 90° to where the East indicator is located in FIGURE 14, the West indicator on the compass face 349 will be under the marker 370. To provide non-linear compass correction for the rotation of the vessel, the ring 350 is rotated so that the West indicator on card 371 is under the marker 370. As is apparent from FIGURE 14, when the West indicator on the card 371 is rotated under the marker 370, the compass ring 350 will have been rotated through an angle greater than 90°. Therefore, this device will automatically insert into the transmission mechanism a non-linear adjustment which compensates for compass non-linearity due to regional variations in magnetic North and due to the effect of the vessel itself and the casing and mechanism of the navigational device upon the compass. It is apparent that the compass correction device of FIGURE 14 may be conveniently combined with the apparatus shown in FIGURES 1, 2, 8 and in FIGURE 9.

Referring to FIGURE 15, a navigation device in accordance with the present invention may be positioned in a glare-proof cabinet in the vessel. If sufficient glare from the cabin of the vessel or sufficient ambient light reached the chart 93, the light from beacons 50, 60 would become invisible. The cabinet is comprised of a base portion 330 into which the entire structure shown in FIGURES 1 and 2, or any modifications thereof, is inserted. The panel section of the device may serve as one side of the enclosed structure and the surrounding material about the orifice 91 may provide the additional sides of the cabinet. The cabinet has a cover 331 which is attached by spring hinge 332 to the base 330. The spring hinge biases the cover 331 closed over the base 330. Hinged sides 334 and 335 are provided which are each comprised of separately hinged panels. Side 334 is comprised of hinged panels 336, 337 and side 335 is comprised of hinged panels 338, 339. Panels 336, 337 are foldable at hinged fold 341 and panels 338, 339 are foldable at hinged fold 342.

When the folds 341, 342 are permitted to fold inward, the spring biased hinge 332 forces the cover 331 closed over cabinet base 330. When the folds 341, 342 are moved outward, the cover 331 is raised up. Once the folds 341, 342 are pushed over center, whereby they begin to fold

15 outward, the abutment means 343 attached to inside of each of panels 337, 339 respectively engages and then pushes against panels 336, 338, this prevents further outward movement of folds 341, 342, whereby the cover 331 is held stationary open.

The interior of cover 331 and of sides 334 and 335 is colored or coated, e.g., with a black material, to prevent glare or ambient light from the cabin of the vessel in which the cabinet 330 is positioned from reaching the chart 93 which has light from beacons 50, 60 shining on it.

There has just been described a navigation means for plotting the position of a vessel.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A radio position plotter for plotting the position of a vessel; said plotter comprising a directional antenna adjustable to face in various directions; first means for rotating said antenna;
   a radio receiver, adaptable for receiving radio signals at more than one frequency, said receiver being connected to said antenna;
   a rotatable and longitudinally translatable shaft, said shaft being longitudinally translatable between a first and a second position;
   tuning means connected with said radio receiver for tuning said receiver to a different radio frequency as said shaft is translated to one of said first and said second positions;
   translating means connected with shaft for translating said shaft selectively to either of said first and said second positions;
   motion transmitting means connecting said antenna and said rotatable shaft, for rotating said shaft when said antenna is rotated;
   a first and a second means for indicating direction on a position plotting chart; said first indicating means being connected with a first cam element and said second indicating means being connected with a second cam element; fixed means affixed to said shaft for being moved into secure engagement with said first cam element when said shaft is moved to said first position and for being moved into secure engagement with said second cam element when said shaft is moved to said second position; said first and said second cam elements being so shaped as to rotate relative to said fixed means to align each of said cam elements with said fixed means, in turn, for reorienting the direction of aim of said indicating means with respect to said shaft, thereby correlating the direction of aim of said indicating means with the direction of aim of said antenna.

2. The radio position plotter of claim 1, also including a compass direction correction device;
   said compass direction correction device including a magnetic compass and a compass direction offsetting means connected with said rotatably longitudinal shaft for reorienting the rotative position of said shaft;
   said offsetting means comprising a differential device comprising a differential having the housing thereof fixedly secured to said antenna, whereby the said housing rotates with said antenna;
   said differential having a first end gear connected with said compass to be rotated by said compass and having a second end gear, opposite said first end gear which is connected with said shaft for causing rotation of said shaft;
   said offsetting means comprising a device connected with said compass for restraining movement of said

16 first end gear of said differential when said first means for rotating said antenna is actuated; and a second movement restraining means connected with said antenna for preventing rotation of said antenna when said first end gear of said differential is rotated by said compass for causing rotation of said shaft.

3. The radio position plotter of claim 1, wherein said first cam element comprises a first cardioid face cam and said second cam element comprises a second cardioid face cam; each of said cardioid face cams having sloping sides which form a single notch into which said fixed means upon said shaft can be moved.

4. The radio position plotter of claim 3 wherein said first and said second cams are in opposed relationship.

5. The radio position plotter of claim 1, wherein each of said indicator means is connected with its respective cam element by means of a support arm, which arm is constructed to permit movement of its respective indicator means to any of a plurality of positions on any map or chart used in conjunction with said plotter without causing any realignment or reaiming of the indicating means as it is moved about.

6. The radio position plotter of claim 5, wherein the support arm for each of said indicating means comprises an articulated arm comprised of at least one second shaft having a belt-like means connecting the respective cam element to a means on said second shaft and a second belt-like means for connecting the second shaft with said indicating means for transmitting rotation of said respective cam to said indicating means.

7. The radio position plotter of claim 1, wherein said indicating means comprises a light projector beacon for projecting light on a plotting chart, which chart is used in conjunction with said plotter; said beacon provided with a source of light;
   in a plane parallel to a chart positioned on said plotter, said light projector beacon is comprised of a portion of two ellipses; the portion of said first ellipse having said source of light as its first focus and having the portion of said second ellipse pass through its second focus; and the portion of the second ellipse having its first focus as said source of light and having said portion of said first ellipse pass through its second focus;
   said light projector beacon having first and second lenses, respectively, at each of said second foci of said portions of said first and said second ellipse;
   in a plane perpendicular to a chart positioned on said plotter, said light projector beacon having a spherical shape;
   said first and second lenses being elongated cylinders with their direction of greatest elongation being in the plane perpendicular to a chart mounted on said plotter.

8. The radio position plotter of claim 7, wherein said plotter comprises a glare proof cabinet for said plotter, including a cover mounted on said plotter for covering said plotter in a manner to minimize the ambient light reaching a chart positioned on said plotter, and a means for supporting said cover in the recited manner.

9. The radio position plotter of claim 2, wherein said compass includes a means for providing non-linear compass correction;
   said device for providing non-linear compass correction comprising,
   a compass element which is attracted toward magnetic North, said compass element being circular and having equally spaced markings of directions around its entire circumference;
   a circular compass card concentric with said compass element and calibrated to reflect non-linearities of compass direction due to the magnetic environment of said compass, whereby said compass card has markings of direction which are unequally spaced about it;

and a marker for spanning said compass and said compass card for permitting alignment of individual markings on said compass and said compass card, whereby non-linear compass correction may be obtained.

10. The radio position plotter of claim 2, wherein said first cam element comprises a first cardioid face cam and said second cam element comprises a second cardioid face cam; each of said cardioid face cams having sloping sides which form a single notch into which said fixed means upon said shaft can be moved; said first and said second cams are in opposed relationship; each of said indicator means is connected with its respective cam element by means of a support arm, which arms is constructed to permit movement of its respective indicator means to any of a plurality of positions on any nautical chart used in conjunction with said plotter without causing any realignment or reaiming of the indicating means as it is moved about; said support arm for each of said indicating means comprises an articulated arm comprised of at least one second shaft having a belt-like means connecting the respective cam element to a means on said second shaft and a second belt-like means for connecting the second shaft with said indicating means for transmitting rotation of said respective cam to said indicating means; said indicating means comprises a light projector beacon for projecting light on a plotting chart, which chart is used in conjunction with said plotter; said beacon being provided with source of light; in a plane parallel to a chart position on said plotter, said light projector beacon is comprised of a portion of two ellipses; the portion of said first ellipse having said source of light as its first focus and having the portion of said second ellipse pass through its second focus; and the portion of the second ellipse having its first focus as said source of light and having said portion of said first ellipse pass through its second focus; said light projector beacon having first and second lenses, respectively, at each of said second foci of said portions of said first and said second ellipse; in a plane perpendicular to a chart positioned on said plotter, said light projector beacon having a spherical shape; said first and said second lenses being elongated cylinders with their direction of greatest elongation being in the plane perpendicular to a chart mounted on said plotter; said compass includes a means for providing non-linear compass corrections; said device for providing non-linear compass correction comprising a compass element which is attracted toward magnetic North, said compass element being circular and having equally spaced markings of directions around its entire circumference; a circular compass card concentric with said compass element and calibrated to reflect non-linearities of compass direction due to the magnetic environment of said compass, whereby said compass card has markings of direction which are unequally spaced about it; and a marker for spanning said compass and said compass card for permitting alignment of individual markings on said compass and said compass card, whereby non-linear compass correction may be obtained.

References Cited
UNITED STATES PATENTS

| | | | |
|---|---|---|---|
| 2,296,041 | 9/1942 | Luck | 343—112 |
| 2,455,164 | 11/1948 | Ebeling | 343—112 |
| 2,485,663 | 10/1949 | Rusch et al | 343—112 X |

RODNEY D. BENNETT, *Primary Examiner.*

RICHARD E. BERGER, *Assistant Examiner.*